United States Patent Office 3,344,141
Patented Sept. 26, 1967

3,344,141
POLY(DIFLUORAMINO) - SUBSTITUTED CYANURIC AND ISOCYANURIC ACID DERIVATIVES AND PRODUCTION THEREOF
Olden E. Paris, Wilmington, Del., assignor to E. I. du Pont de Nemours and Company, Wilmington, Del., a corporation of Delaware
No Drawing. Filed Nov. 9, 1962, Ser. No. 237,440
6 Claims. (Cl. 260—248)

This invention relates to certain substituted cyanuric and isocyanuric acids and to their preparation.

The invention provides a group of new compounds that are a source of energy capable of imparting high specific impulse to rocket propellants. The compounds are also useful as explosives.

The compounds of the invention are poly(difluoramino)-substituted compounds. More specifically, they are compounds in which at least two of the three hydrogen atoms of cyanuric acid or isocyanuric acid are replaced by poly(difluoramino)-substituted, 2 to 5 carbon, alkyl radicals in which each difluoramino substituent is on a carbon atom adjacent to a carbon atom which also has a difluoramino substituent.

The poly(difluoramino)-substituted compounds of the invention are prepared by reacting tetrafluorohydrazine with cyanuric acid or isocyanuric acid in which at least two of the hydrogen atoms of such acid have been replaced by an alkenyl or alkadienyl radical of two to five carbon atoms. The tetrafluorohydrazine reacts to open the double bonds of such olefinic radicals and results in a pair of difluoramino substituents at the locus in the radical where the double bond has been; that is, there results a difluoramino substituent on a carbon atom adjacent to a carbon atom which also has a difluoramino substituent. For example, a 1-propenyl substituent on cyanuric or isocyanuric acid after reaction with tetrafluorohydrazine becomes a 1,2-bis(difluoramino)propyl radical and a 1,4-pentadienyl substituent becomes a 1,2,4,5-tetrakis(difluoramino)pentyl radical.

Thus it will be seen that the compounds of the invention can be represented by the formulas (1)
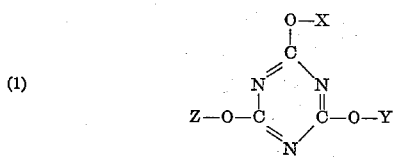

and

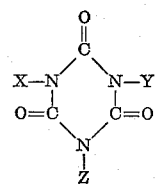

where any two or all three of X, Y and Z are independently selected from a 2 to 5 carbon alkyl radical having at least one pair of difluoramino substituents, and any one of X, Y and Z not so selected is hydrogen. The compounds of the invention can also be viewed as derivatives of s-triazine, the substituted cyanuric acids being alkoxy derivatives of s-triazine, commonly referred to as cyanuric acid esters; and the substituted isocyanuric acids being N-substituted derivatives of s-triazine-2,4,6-(1H,3H,5H)-trione.

The reaction of tetrafluorohydrazine with a substituted cyanuric or isocyanuric acid having alkenyl and alkadienyl substituents to give the difluoramino-substituted compounds of the invention is effected in the presence of an inert solvent for the substituted cyanuric or isocyanuric acid. The tetrafluorohydrazine also may dissolve in the solvent. The solvent can be any liquid not reactive with the reaction components under the conditions used. Preferably, the solvent is low-boiling so that it can be removed easily from the reaction product. Compounds particularly useful as solvents are the halogenated hydrocarbons, e.g., chloroform, methylene chloride, carbon tetrachloride, and chlorofluoro hydrocarbons such as 1,1,2-trichloro-1,2,2-trifluoroethane and trichlorofluoromethane. Ketones, e.g., acetone, also are useful.

The temperature at which the reaction is effected will vary according to other reaction variables and the stability of the particular compound being prepared but preferably will be within the range from about 50° C. to about 200° C. At lower temperatures the reaction rate is low unless exceedingly high pressure is used. Temperatures much above 200° C. generally tend to cause product decomposition. The reaction can be effected at atmospheric as well as superatmospheric pressure although superatmospheric pressure, for example at least about 50 p.s.i.ga., is desirable in order to achieve a reasonably high reaction rate and to prevent any low-boiling solvent from vaporizing. Pressures as high as 1000 p.s.i.ga. can be used, although generally there is no advantage in operating at pressures much above 500 p.s.i.g.

The amount of tetrafluorohydrazine used will be at least the stoichiometric amount required to add a pair of difluoramino groups to all of the olefinic double bonds in the substituted cyanuric or isocyanuric acid. However, it is preferred to introduce an excess of tetrafluorohydrazine to assure complete reaction, the particular amount used over and above the stoichiometric amount having no critical effect on the reaction.

The following examples illustrate compounds of the invention, their preparation, and their utility.

Example 1

Tetrafluorohydrazine ($F_2N-NF_2$) under an initial pressure of 200 p.s.i.g. was introduced into a 250-milliliter pressure vessel containing a solution of 3 grams of trivinyl isocyanurate (1,3,5-trivinyl-s-triazine-2,4,6-(1H,3H,5H)-trione) in 75 milliliters of chloroform, and the mixture was heated to 125° C. The pressure rose to a maximum of 305 p.s.i.g. After 32 minutes of heating, the reaction vessel was cooled and vented, and the reaction mixture removed from the vessel. The chloroform was distilled off leaving a viscous oil which crystallized to a gummy solid on standing at room temperature. The solid material changed to a free-flowing liquid at 48–50° C. The product was identified as tris-[1,2-bis(difluoramino)ethyl]isocyanurate, i.e.,

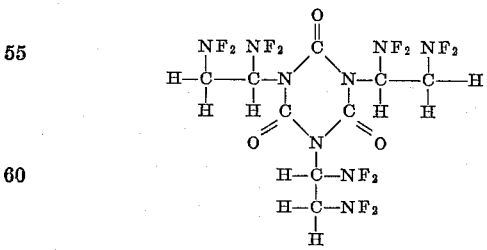

The infrared spectrum for the compound showed characteristic absorption peaks at $3.35\mu$ (C—H absorption); $5.8\mu$ (C=O absorption); $7.0\mu$ (C—C absorption); $10.3\mu$, $11.3\mu$, and $12.25\mu$ (—$NF_2$ absorption); and $13.5\mu$ (isocyanurate ring absorption). The fluorine nuclear magnetic resonance spectrum showed the presence of —$CH_2NF_2$ and —$CHNF_2$.

To evaluate its utility as an explosive or propellant, the isocyanurate was tested for brisance, and sensitivity to heat, impact, and static. In the brisance test, the compound was placed in a 0.25-inch-diameter shell, the shell placed on end on a lead plate 1.5 inches x 1.5 inches x 5/32 inch thick, and the compound initiated by a blasting cap. In this test, the size of the hole produced in the plate is a measure of the degree of brisance, a No. 0 hole indicating the greatest explosive power measurable by the test, the degree of brisance decreasing with increasing No. up to 6.

Two tests were made for heat sensitivity. In one, the isocyanurate was heated gradually (at ca. 5° C./minute) in a copper block to 250° C. In the other, the compound was dropped onto a metal bar heated to 250° C.

Impact sensitivity was determined by measuring the distance from which a 1-kg. weight had to drop onto the compound to produce explosion in 50% of the trials made.

To measure static sensitivity, the compound was exposed to a 58,600 man-equivalent-volt charge (1 man-equivalent-volt=energy of a condenser of 0.0003 microfarad capacitance charged to a potential of 1 volt).

In the brisance test, tris-[1,2-bis(difluoramino)ethyl] isocyanurate made a No. 0+ hole in the lead plate, indicating that the compound is a very powerful explosive. The explosive compound is relatively safe to handle and store, as evidenced by its relative insensitivity to impact (435 cm.), insensitivity to static (did not fire in the static test), and heat stability (fumed off at 250° C. in the copper block, and fumed off immediately on the hot bar).

*Example 2*

Tetrafluorohydrazine under an initial pressure of 200 p.s.i.g. was introduced into a 250-milliliter pressure vessel containing a solution of 3 grams of triallyl isocyanurate (1,3,5-triallyl-s-triazine-2,4,6-(1H,3H,5H)-trione) in 75 milliliters of chloroform. The mixture was heated to 100° C. whereupon the pressure rose to a maximum of 300 p.s.i.g. The reaction was completed in 2.5 hours as evidenced by the fact that there was no further drop in pressure. After cooling of the reaction mixture, the chloroform was distilled off, leaving a colorless, syrupy liquid, which was identified as tris-[2,3-bis(difluoramino)propyl] isocyanurate, i.e.,

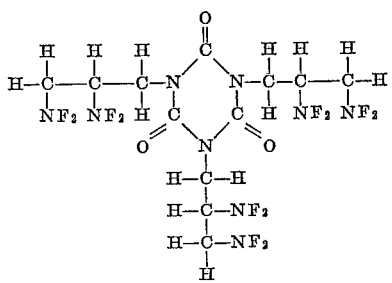

The infrared spectrum for the compound showed characteristic absorption peaks at 3.3–3.4μ (C—H absorption); 5.9μ (C=O absorption); 6.9μ and 7.0μ (C—C absorption); 10.3μ, 11.75–11.8μ, and 12.4μ (—NF₂ absorption); and 13.1μ (isocyanurate ring absorption). The fluorine resonance spectrum showed the presence of —CH₂NF₂ and —CHNF₂.

The compound is a propellant, giving a No. 5 hole in the lead plate and a 480 cm. drop test (smoked, but did not detonate); it did not fire in the static test, and was heat-stable (no action at 250° C. in the copper block, and fumed off in 10 seconds on the hot bar).

Illustrative of other compounds that are made by the procedure of Example 2 by substituting the appropriate olefin-substituted s-triazine trione for the trione of that example are:

bis-[1,2-bis(difluoramino)ethyl]isocyanurate,
bis-(or tris-)[1,2-bis(difluoramino)-1-methylethyl]isocyanurate,
bis-(or tris-)[1,2-bis(difluoramino)propyl]isocyanurate,
bis-(or tris)[1,2-, or 2,3-, or 3,4-bis(difluoramino)butyl] isocyanurate,
bis-(or tris-)[1,2- or 2,3-bis(difluoramino)-1- or 2-methylpropyl]isocyanurate,
bis-(or tris-)[1-difluoramino-1-(difluoramino)methylpropyl]isocyanurate,
bis-(or tris-)[1,2,3,4-tetrakis(difluoramino)butyl]isocyanurate,
bis-(or tris-)[1,2-, 2,3-, 3,4-, or 4,5-bis(difluoramino) pentyl]isocyanurate,
bis-(or tris-)[1,2-, 2,3-, or 3,4-bis(difluoramino)-1-, 2-, or 3-methylbutyl]isocyanurate,
bis-(or tris-)[1-difluoramino-1-(difluoramino)methylbutyl]isocyanurate,
bis-(or tris-)[1,2- or 2,3-bis(difluoramino)-1-ethylpropyl] isocyanurate,
bis-(or tris-)[2,3-bis(difluoramino)-2-ethylpropyl]isocyanurate,
bis-(or tris-)[1,2- or 2,3-bis(difluoramino)-1,2-dimethylpropyl]isocyanurate,
bis-(or tris-)[1,2,3,4-, 1,2,4,5-, or 2,3,4,5-tetrakis(difluoramino)pentyl]isocyanurate,
bis-(or tris-)[1,2,3,4-tetrakis(difluoramino)-1-methylbutyl]isocyanurate,
bis-(or tris-)[1,2,3- or 1,3,4-tris(difluoramino)-1-(difluoramino)methylbutyl]isocyanurate,
bis-(or tris-)[1,2,3-tris(difluoramino)-1-(1'-difluoramino) ethylpropyl]isocyanurate, and
bis(or tris-)[1,2,3,4-tetrakis(difluoramino)-2- or 3-methylbutyl]isocyaturate.

*Example 3*

Into a 250-milliliter pressure vessel containing a solution of 3 grams of triallyl cyanurate (2,4,6-tris(allyloxy) s-triazine) in 75 milliliters of chloroform was introduced tetrafluorohydrazine under an initial pressure of 200 p.s.i.g. The mixture was heated to 100° C., the pressure rising to a maximum of 303 p.s.i.g. After 1.25 hours the reaction was completed (i.e., no further pressure drop), the reaction mixture was cooled, and the chloroform distilled off, leaving a colorless viscous liquid which was identified as tris-[2,3-bis(difluoramino)propyl]cyanurate, i.e.,

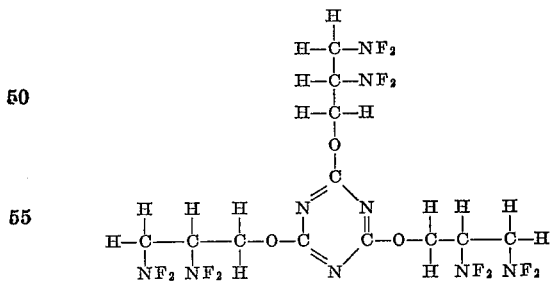

The infrared spectrum for the compound showed characteristic absorption peaks at 3.4μ (C—H absorption); 8.7μ and 9.7μ (C—O—C absorption); 10.25μ, 11μ, 11.5μ, 11.7μ, and 12.4μ (—NF₂ absorption); and 12.2μ (cyanurate ring absorption). The fluorine resonance spectrum showed the presence of —CH₂NF₂ and —CHNF₂.

In the brisance test, tris[2,3-bis(difluoramino)propyl] cyanurate made a No. 0 hole in the lead plate, indicating that the compound is a powerful explosive. The compound is somewhat sensitive to impact (69 cm.), static-insensitive (did not fire in the static test), and heat-stable (autoignited at 160° C. in the copper block, and fumed off in 10 seconds on the hot bar).

Illustrative of other compounds that are made by the procedure of Example 3 by substituting the appropriate olefinic ester of cyanuric acid for the triallyl cyanurate of that example are bis-(or tris-)[1,2-bis(difluoramino)ethyl]cyanurate,
bis-(or tris-)[1,2-bis(difluoramino)-1-methylethyl]cyanurate,
bis-(or tris-)[1,2-bis(difluoramino)propyl]cyanurate,
bis-[2,3-bis(difluoramino)propyl]cyanurate,
bis-(or tris-)[1,2-, 2,3-, or 3,4-bis(difluoramino)butyl]cyanurate,
bis-(or tris-)[1,2- or 2,3-bis(difluoramino)-1- or 2-methylpropyl]cyanurate,
bis-(or tris-)[1-difluoramino-1-(difluoramino)methylpropyl]cyanurate,
bis-(or tris)[1,2,3,4-tetrakis(difluoramino)butyl]cyanurate,
bis-(or tris-)[1,2-, 2,3-, 3,4-, or 4,5-bis(difluoramino)pentyl]cyanurate,
bis-(or tris-)[1,2-, 2,3-, or 3,4-bis(difluoramino)-1-, 2-, or 3-methylbutyl]cyanurate,
bis-(or tris-)[1-difluoramino-1-(difluoramino)methylbutyl]cyanurate,
bis-(or tris-)[1,2- or 2,3-bis(difluoramino)-1-ethylpropyl]cyanurate,
bis-(or tris-)[2,3-bis(difluoramino)-2-ethylpropyl]cyanurate,
bis-(or tris-)[1,2- or 2,3-bis(difluoramino)1,2-dimethylpropyl]cyanurate,
bis-(or tris-)[1,2,3,4-, or 1,2,4,5-, or 2,3,4,5-tetrakis(difluoramino)pentyl]cyanurate,
bis-(or tris-)[1,2,3,4-tetrakis(difluoramino)-1-methylbutyl]cyanurate,
bis-(or tris-)[1,2,3- or 1,3,4-tris(difluoramino)-1-(difluoramino)methylbutyl]cyanurate,
bis-(or tris-)[1,2,3-tris(difluoramino)-1-(1'-difluoramino)ethylpropyl]cyanurate, and
bis-(or tris-)[1,2,3,4-tetrakis(difluoramino)-2- or 3-methylbutyl]cyanurate.

*Example 4*

Tetrafluorohydrazine under an initial pressure of 200 p.s.i.g. was introduced into a 250-milliliter pressure vessel containing a solution of 1 gram of diallyl isocyanurate (1,2-diallyl-s-triazine-2,4,6-(1H,3H,5H)-trione) in 75 milliliters of chloroform, and the mixture was heated to 100° C. whereupon the pressure rose to a maximum of 310 p.s.i.g. After 1.5 hours at this temperature, the reaction mixture was cooled and the chloroform distilled off, leaving a viscous liquid which changed to a waxy solid on standing at room temperature. The solid material, which softened at 88–90° C., was identified as bis-[2,3-bis(difluoramino)propyl]isocyanurate, i.e.,

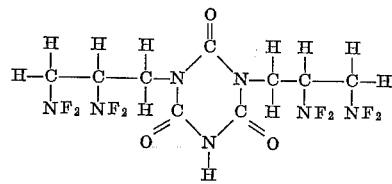

The infrared spectrum for the compound showed characteristic absorption peaks at $3.1\mu$ (N—H absorption); $5.8$ and $5.95\mu$ (C=O absorption); $10.3\mu$, $11.2\mu$, $11.8\mu$, and $12.3$–$12.4\mu$ (—$NF_2$ absorption); and $13.1\mu$ (isocyanurate ring absorption). The fluorine resonance spectrum showed the presence of —$CH_2NF_2$ and —$CHNF_2$.

What is claimed is:

1. A poly(difluoramino)-substituted compound having the structure of an acid selected from the class consisting of cyanuric acid and isocyanuric acid in which at least two of the hydrogen atoms of the acid are replaced by poly(difluoramino)-substituted, 2–5 carbon, alkyl radicals in which each difluoramino substituent is on a carbon atom adjacent to a carbon atom which also has a difluoramino substituent.
2. Tris-[1,2-bis(difluoramino)ethyl]isocyanurate.
3. Tris-[2,3-bis(difluoramino)propyl]isocyanurate.
4. Tris-[2,3-bis(difluoramino)propyl]cyanurate.
5. Bis-[2,3-bis(difluoramino)propyl]isocyanurate.
6. A process for the preparation of a compound of claim 1 which comprises reacting tetrafluorohydrazine with a compound having the structure of an acid selected from the group consisting of cyanuric acid and isocyanuric acid in which at least two of the hydrogen atoms of the acid are replaced by a 2 to 5 carbon radical selected from the class consisting of alkenyl and alkadienyl at a temperature of about from 50 to 200° C. in an inert solvent.

No references cited.

WALTER A. MODANCE, *Primary Examiner.*

L. A. SEBASTIAN, J. M. FORD, *Assistant Examiners.*

C. D. QUARFORTH, REUBEN EPSTEIN, *Examiners.*